United States Patent Office.

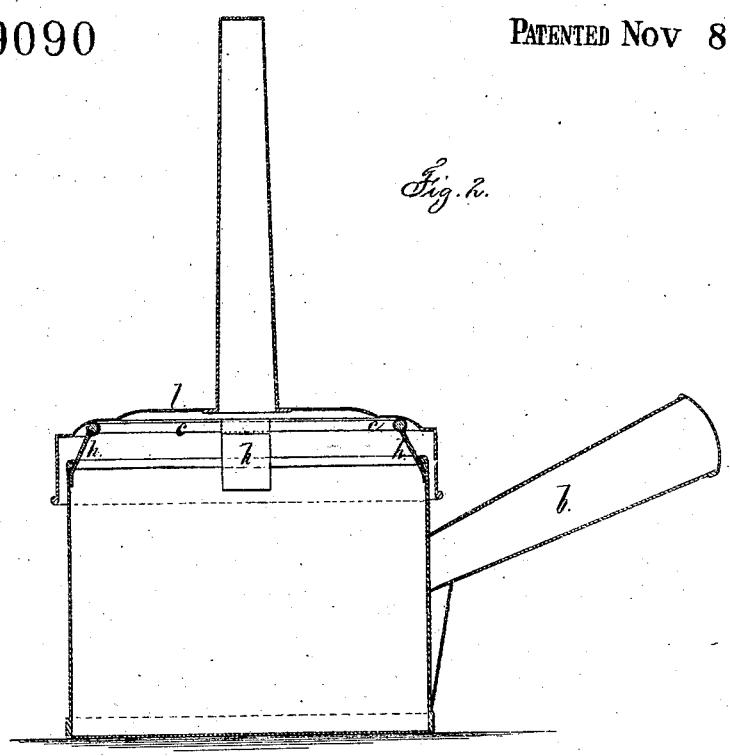
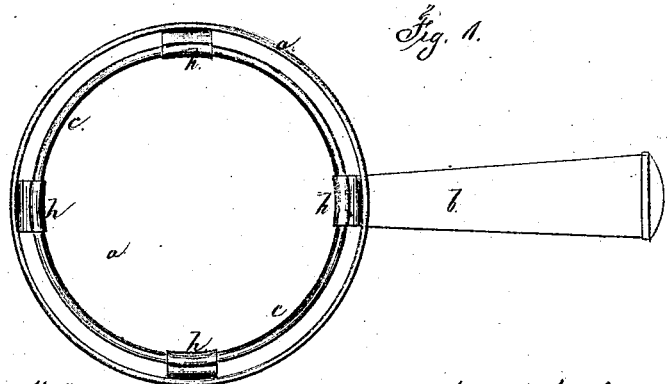

JOHN J. WILSON, OF NEW YORK, N. Y.

Letters Patent No. 109,090, dated November 8, 1870.

IMPROVEMENT IN POTS FOR GLUE, PAINT, &c.

The Schedule referred to in these Letters Patent and making part of the same.

*To all whom it may concern:*

Be it known that I, JOHN J. WILSON, of the city and State of New York, have invented a certain new and useful Improvement in Pots for Glue, Varnish, &c.; and the following is hereby declared to be a full and correct description of the same.

Heretofore it has been usual to draw or press the glue or other brush against the side or edge of the pot to press out the surplus material from the same, with glue, paint, and varnish. This causes a waste of material, as the same forms in layers upon the inside of the pot from the constant pressing of the brush against the same. Said material, besides being wasted, is difficult to remove from the sides of the pot in cleaning, and the pot is always more or less dirty from paint or other material running from the top edge down the outside of the pot.

A cross-piece has been applied to paint and other pots, against which the brush is drawn to press out the surplus paint, but the same is not always in a convenient position for the person taking paint or other material from the pot.

With glue, the repeated drawing of the brush against the inside and edge of the pot, forms a thick layer upon the same in a short time, and said layer has to be removed, and often thrown away, because the heat has rendered it unfit for being put into the pot and re-heated.

To avoid the waste of paint, glue, &c., above mentioned, and to keep the pot or can in a cleanly condition, is the object of my invention; and the same consists in a ring supported above the top of the pot or can, and against which the brush is drawn to press out the surplus paint or other material from the brush, said ring being of a less diameter than the pot or can to which it is applied, in order that the material pressed from the brush may fall back directly into the pot without running down the sides of the same, thereby avoiding the waste of material heretofore usual.

In the drawing—

Figure 1 is a plan of a pot fitted with my improvement; and

Figure 2 is a vertical section of the same.

I have shown said improvement as applied to a varnish-pot or can, but I here remark that the same can be applied to paint, glue, or other pots.

*a* represents the body of the pot for containing the varnish, and the same is provided with the handle *b*, as usual, and said pot may be of any desired size or material.

The ring *c*, against which the brush is drawn to press out the surplus varnish or other material, is supported above the top of the pot by the arms *h h*, attached to the inside of the pot, and said ring is of a less diameter than the pot or can to which it is applied, so that said surplus material as pressed from the brush will not run down the sides of the pot, but drop from the brush and ring directly into the material in the pot, and the brush itself is kept from contact with the pot by the ring being sufficiently above.

The cover *l* for the pot or can may be supported by the ring *c*, or otherwise, and may fit the can or pot either loosely or not, as occasion may require.

I have shown the cover *l* as provided with the recess to receive the handle of the brush, as usual in varnish pots, and as supported by the ring *c*, and fitting the pot loosely, in order that the cover may be easily removed or replaced.

My improvement can be applied at a trifling cost to all kinds of pots for containing glue, varnish, paint, &c., and by its use a considerable saving in material will be effected, as aforesaid. The outside of the pot will not get soiled except by carelessness, and the ring forms no obstruction to the mixing of material in said pot, or to taking it from the same.

I claim as my invention—

A paint or other pot fitted with a ring of a less diameter than the pot to which it is applied, and supported above the pot by arms attached to and rising from the pot, substantially as and for the purposes set forth.

Dated May 25, A. D. 1870.

JOHN J. WILSON.

Witnesses:
HAROLD SERRELL,
GEO. T. PINCKNEY.